May 21, 1968    A. K. SCHNEEMAN    3,383,955
INDEXING ASSEMBLY

Filed Sept. 28, 1965    3 Sheets-Sheet 1

INVENTOR
ANTHONY K. SCHNEEMAN

BY *Hauke & Hauke*

ATTORNEYS

May 21, 1968  A. K. SCHNEEMAN  3,383,955
INDEXING ASSEMBLY

Filed Sept. 28, 1965  3 Sheets-Sheet 3

INVENTOR
ANTHONY K. SCHNEEMAN

BY *Hauke & Hauke*
ATTORNEYS

United States Patent Office 3,383,955
Patented May 21, 1968

3,383,955
INDEXING ASSEMBLY
Anthony K. Schneeman, Southfield, Mich., assignor to Clawson Tool Company, Clawson, Mich., a corporation of Michigan
Filed Sept. 28, 1965, Ser. No. 490,960
11 Claims. (Cl. 74—822)

ABSTRACT OF THE DISCLOSURE

A rotary index table actuated by a driving element engageable with successive notches in the table, the driving element being disengaged by a locking element entering the same notch at the end of an indexing cycle, and the locking element being disengaged by a cam movable with the driving element when same is moved to and engages in the successive notch prior to successive actuation of the table.

---

Figure 1:
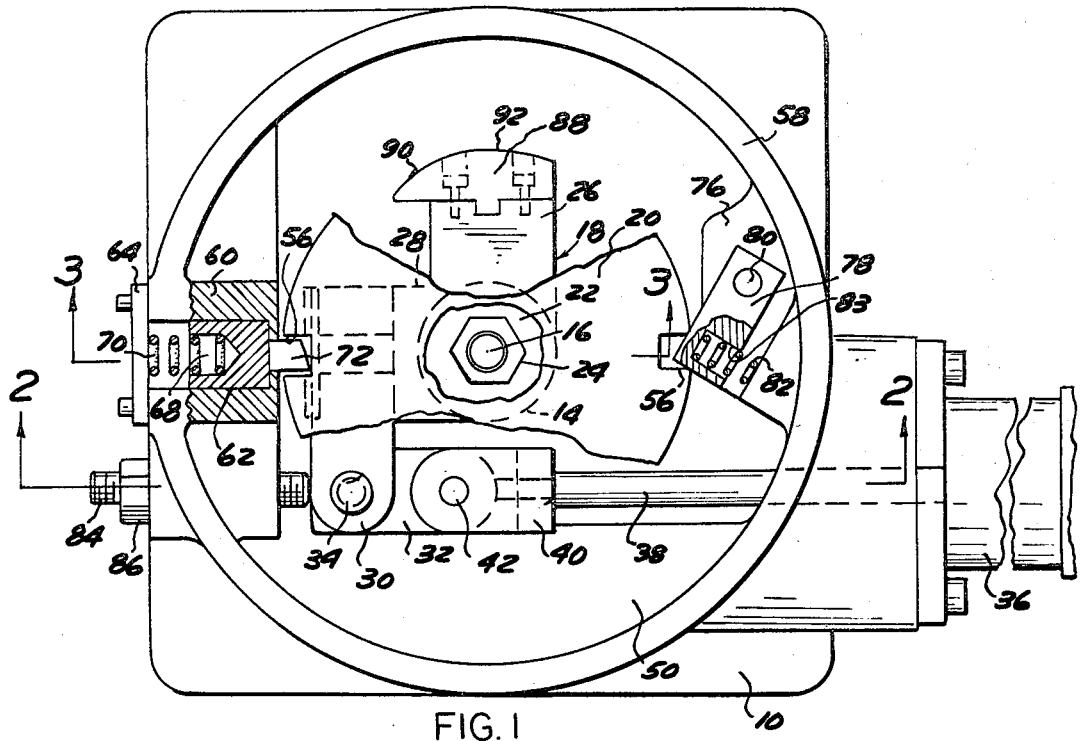

In the current art, rotary workpiece tables are provided which utilize an indexing mechanism for moving the table from one work station to another and for locking the table at each station until the operation on the workpiece has been completed. Some of these employ indexing mechanism comprising a hub member positioned beneath an index plate to which is mounted the work plate. The index plate and thus the work plate are moved from station to station by a driving dog carried by the hub member and engaging in one of a number of spaced notches provided in the index plate so that with the driving dog so engaged, rotation of the hub member produces a corresponding rotation of the index plate and the work plate. When the work plate reaches the next work station an index pin is moved into locking engagement with the index plate, the driving dog is retracted from the index plate and the hub member is returned to its original position while the work plate remains locked at the work station by the index pin.

The disengagement and engagement between the driving dog and the index plate and between the index pin and the index plate are at present usually accomplished by various mechanical or hydraulic assemblies including mechanical linkages, pivots, cams or the like.

The present invention provides an indexing assembly for such workpiece tables in which disengagement of the driving dog and engagement and disengagement of the index pin are accomplished automatically and without expensive and complex mechanical or hydraulic assemblies.

As will become more apparent as the description proceeds, in the assembly of the present invention the index pin is retracted from engagement with the index plate by a cam portion provided on the hub member so that the driving dog can move the index plate to the next station. Once the index plate is brought to the next station, the index pin is urged into the notch occupied by the driving dog by a spring so that the driving dog is moved from engagement with the index plate by the index pin. This permits the hub member to be returned to its original position in which the driving dog engages in the next notch provided in the index plate. In this way the necessary engagements and disengagements of the hub member and the index pin with the index plate are accomplished automatically upon reciprocating rotating movement of the hub member without the necessity of providing complex means for producing such action.

It is an object then of the present invention to improve rotary workpiece tables and the like by providing an improved indexing assembly for such tables.

It is another object of the present invention to reduce the cost of manufacturing rotary workpiece tables by providing an indexing assembly for such tables having an economically produced and simply constructed means for automatically engaging and disengaging the driving means and the locking means from the work table of such devices.

It is still another object of the present invention to improve indexing assemblies for rotary workpiece tables and the like by providing a construction in which reciprocating rotation of a hub member produces rotation of an index plate, locking engagement between an index pin and the index plate upon the index plate being moved to the indexed station, simultaneous disengagement of the hub member and the index plate when the plate is in the locked position to permit the hub member to be returned to its original position and disengagement between the index pin and the index plate when the hub member has been moved to a predetermined return position so that engagement of the hub member and the index plate and forward rotational movement of the hub member will move the index plate to the next station.

Figure 2:
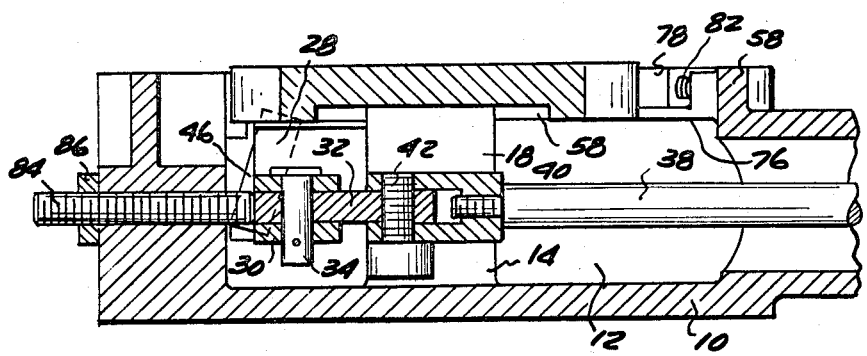
Figure 3:
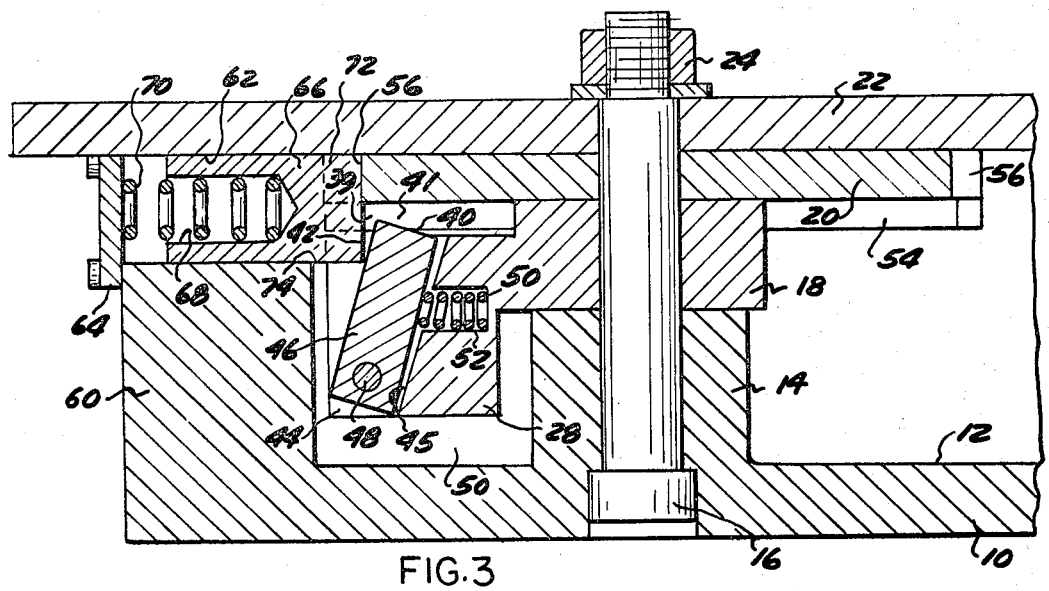
Figure 6:
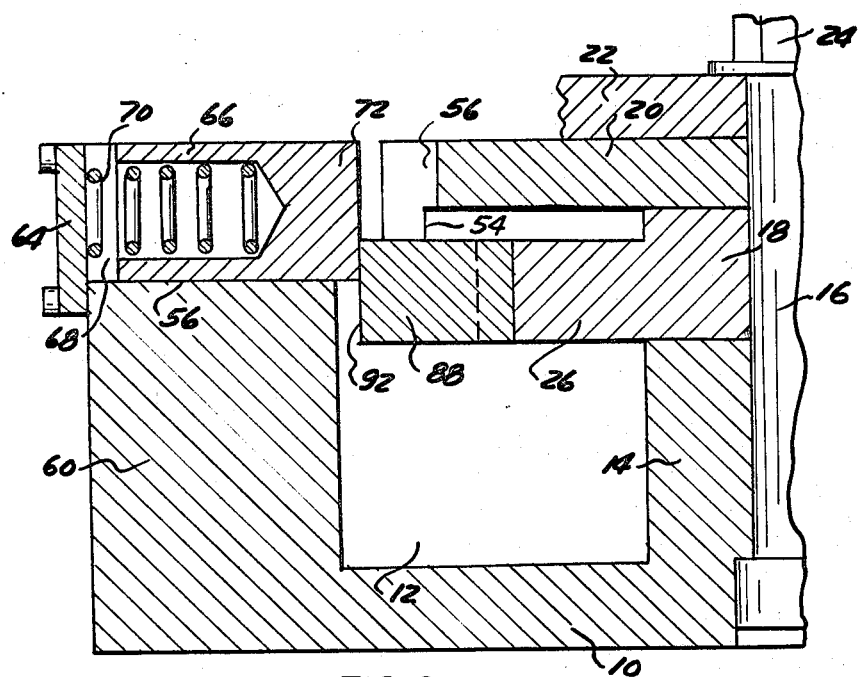
Figure 4:
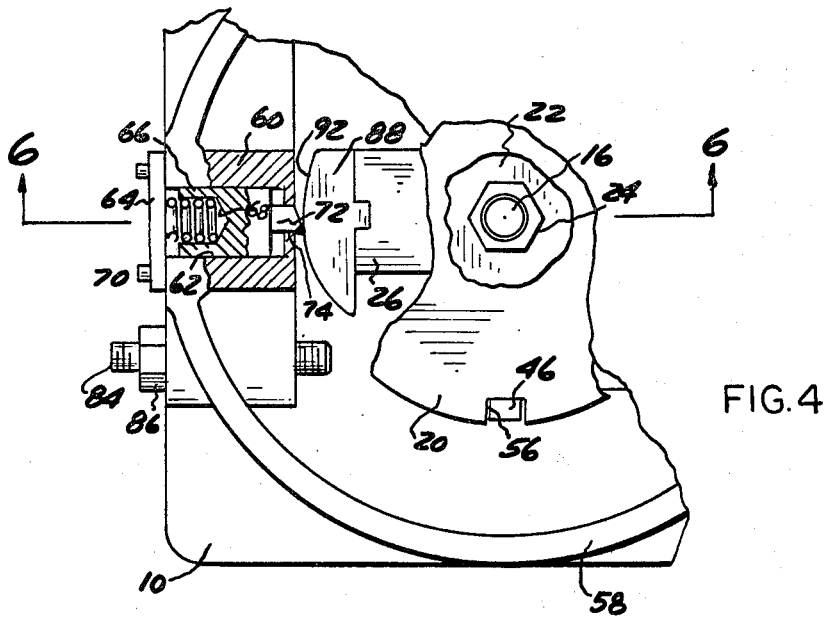
Figure 5:
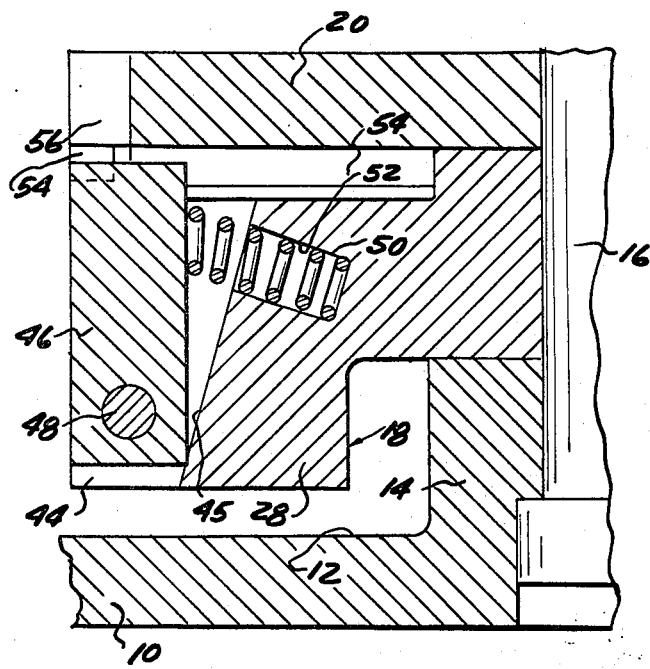

Still further objects and advantages of the present invention will be readily apparent to one skilled in the art to which the invention pertains upon reference to the following description. The description makes reference to the accompanying drawings in which like reference characters refer to like parts throughout the several views and in which:

FIG. 1 is a plan view of a rotary work table embodying the present invention with the work plate removed and portions broken away for purposes of clarity and with the actuating mechanism illustrated in an extended position, FIG. 2 is a transverse cross sectional view taken substantially at line 2—2 of FIG. 1, FIG. 3 is a transverse cross sectional view taken substantially at line 3—3 of FIG. 1 with the work plate shown in position for purposes of clarity, FIG. 4 is a fragmentary plan view of structure shown in FIG. 1 but illustrating the actuating mechanism in a retracted position, FIG. 5 is a fragmentary cross sectional view illustrating the driving dog in a driving position, and FIG. 6 is a cross sectional view taken substantially on line 6—6 of FIG. 4.

Now referring to the drawings for a more detailed description of the present invention, a preferred embodiment thereof is illustrated as comprising a housing 10 which is, as can best be seen in FIG. 3, provided with a cavity 12 opening to one face thereof. The housing 10 is provided with a boss portion 14 extending upwardly into the cavity 12. A shaft 16 is fixed to the housing 10 and extends axially upwardly through the boss portion 14 and into the cavity 12.

The boss portion 14 and the shaft 16 provides the means for positioning and rotatably mounting a hub member 18 within the cavity 12. A circular index plate 20 is freely mounted to the shaft 16 above the hub member 18 and a work plate 22 is freely mounted to the shaft 16 above the index plate 20 and above the housing 10. The work plate 22 is fixed to the index plate 20 by any convenient means (not shown) for rotation therewith. The upper end of the shaft 16 is preferably threaded to receive a nut 24 for locking the hub member 18, the index plate 20 and the work plate 22 in position.

As can best be seen in FIGS. 1, 2 and 3, the hub member 18 preferably comprises a first radially extending portion 26 and a second radially extending portion 28 which are spaced substantially 90°. A clevis 30 is formed on the lower side of the portion 28 of the hub member 18 and extends substantially normal therefrom as can best be seen in FIG. 1, and is pivotally connected at its free end to a connecting link 32 by a first clevis pin 34. A conventional actuating cylinder 36 is mounted to the side of the housing 10 and is provided with a rod 38 extending into the cavity 12. A piston clevis 40 is fixed to the free end of the rod 38 and is pivotally secured to the connecting link 32 by a second clevis pin 42. It is apparent then that reciprocating rectilinear movement of the rod 38 as produced by the cylinder 36 produces a corresponding reciprocating rotative movement of the hub member 18 about the shaft 16.

As can best be seen in FIG. 3, the portion 28 of the hub member 18 is formed downwardly of the upper face of the boss portion 14 and is provided with a peripheral recess 44 having an inner face 45 which extends angularly inwardly with respect to the axis of the shaft 16. A cylindrical driving dog 46 is pivotally mounted within the recess 44 by a pivot pin 48 extending through the lower extremity of the dog 46. A spring 50 mounted in a pocket 52 provided in the portion 28 engages the upper portion of the dog 46 to pivot the upper portion thereof outwardly from the recess 44.

The index plate 20 is provided with a peripheral downwardly extending skirt portion 54 and a plurality of circumferentially spaced notches 56 are provided in the outer edge of the index plate 20 and the skirt portion 54. The notches 56 are preferably spaced 90° apart so that in the embodiment disclosed, four are provided although it will become apparent as the description proceeds that more or less than this number can be provided with slight modifications.

As can best be seen in FIG. 5, the spring member 50 is operable to urge the driving dog 46 to pivot outwardly into the notch 56 when the hub member 18 is moved to a rotated position in which one of the notches 56 is brought into registry with the recess 44. With the driving dog 46 in this position, rotation of the hub member 18 as produced by the cylinder 36 produces a corresponding rotation of the index plate 20 and the work plate 22.

The housing 10 is provided with a cylindrical upstanding wall 58 defining the upper portion of the cavity 12 as can best be seen in FIGS. 1, 2 and 4. The wall 58 is provided with an inwardly thickened portion 60 defining a cylindrical radially extending recess 62 closed at the outer end by a cap 64. A cylindrical member 66 is carried in the recess 62 and is provided with a pocket 68 which receives a spring 70 and a grooved end portion 72 urged through an opening 74 provided in the wall portion 60 by the spring 70. The cylindrical member 66 is mounted in a position such that the end portion 72 is urged by the spring 70 into the notches 56 when the index plate 20 is moved to a position in which the end portion 72 and one of the notches 56 are in alignment.

The side of the wall 58 opposite the thickened portion 60 is provided with an inwardly thickened portion 76 which provides the means for carrying a pivotally mounted pawl 78 as can best be seen in FIG. 1. The pawl 78 is pivotally mounted near one end by a pin 80 and its opposite end is urged radially outwardly by a spring 82 received in a pocket 83 provided in the side of the pawl 78. In this way, engagement of the pawl 78 within one of the notches 56 as shown in FIG. 1 prevents the index plate 20 from rotating in a counterclockwise direction but permits clockwise rotation of the index plate 20.

As can best be seen in FIGS. 1–2, a stop screw 84 is mounted in the housing 10 with its free end extending into the cavity 12 to engage the free end of the connecting link 32 upon extending movement of the rod 38. The screw 84 is adjustably mounted by a nut 86.

As can best be seen in FIGS. 1, 4 and 6, the portion 26 of the hub member 18 carries a cam member 88 at its outer edge. The cam member 88 is positioned below the skirt portion 54 of the index plate 20 and is provided with a uniform progressive rise surface 90 and a land surface 92. The rise surface 90 begins at a radial distance from the axis of the shaft 16 which is substantially equal to the radial distance of the inner edge of the skirt portion 54 from the axis of the shaft 16 and increases in radial distance progressively to the land surface 92 which is radially outwardly spaced from the outer edge of the skirt portion 56 as can best be seen in FIG. 6.

The operation of the work table of the present invention is as follows: With the cylinder 36 in a position retracting the rod 38, the assembly will be in the position illustrated in FIG. 4. That is, the hub member 18 will be rotated to the extreme counterclockwise position to bring the land surface 92 of the cam portion 88 into engagement with the reduced end portion 72 and the driving dog 46 into one of the notches 56. Actuation of the cylinder 36 to move the rod 38 to the extended position will cause the hub member 18 to move clockwise toward the position illustrated in FIG. 1. The engagement shown in FIG. 5 between the driving dog 46 and the index plate 20 will cause the index plate 20 and the work plate 22 to be rotated about the shaft 16. This movement will continue until the notch 56 receiving the driving dog 46 is brought into a position in registry with the reduced end portion 72 of the cylindrical member 66 at which point the end portion 72 will be urged by the spring member 70 into the notch 56. The spring member 70 is stronger than the spring member 50 so that as the end portion 72 enters the notch 56, it engages the driving dog 46 and pivots it out of engagement with the index plate 20 as shown in FIG. 3. The index plate 20 and the work plate 22 are now locked by the cylindrical member 66 in a work position.

The work plate 22 will remain locked in the work position until the cylinder 36 is actuated to retract the rod 38. Retraction of the rod 38 causes the hub member 18 to move counterclockwise toward the position illustrated in FIGS. 4 and 6. Since the driving dog 46 has been forced out of the notch 56 and the end portion 72 remains in the notch 56, the index plate 20 and the work plate 22 will not move during movement of the hub member 18 in a counterclockwise direction. Counterclockwise movement of the hub member 18 continues with the driving dog 46 riding on the inner surface of the flange 54 until the driving dog 46 is brought into registry and urged by the spring 50 to engage with the next notch 56 and the end portion 72 is at the same time moved out of the notch 56 by the land surface 92 of the cam member 88 as can best be seen in FIG. 6. With the end portion 72 removed from the notch 56, the index plate 20 is free to be rotated again and extension of the rod 38 will bring the index plate 20 and the work plate 22 to the next work station substantially as described above.

The pawl 78 is provided to seat within one of the notches 56 when the index plate 20 is at work station. By preventing counterclockwise movement of the index plate 18, it aids the end portion 72 in preventing the index plate 20 from being moved in a reverse direction through friction as the hub member 18 is being returned to the starting position.

The stop screw 84 is provided to limit the rotational movement of the hub member 18 to a point at which the driving dog 46 is brought into position to be engaged by the end portion 72 and aids in preventing the driving dog 46 from being moved past the reduced end portion 72 before the end portion 72 has the chance of entering the notch 56.

From the above description it is apparent that an assembly has been described in which the elements cooperate with one another to produce indexing of the work plate one position at a time. Although in the preferred description the work plate can be moved to four different work stations, it is apparent that with slight modifications to the elements, the device could be made to provide indexing to fewer or more work stations as desired. Further, it is apparent that actuating means other than the cylinder 36 could also be used, although the device of the present invention lends itself simply to a rectilinear type cylinder with self contained reversing controls.

It is also important that although I have described but one embodiment of the present invention, many changes and modifications can be made therein without departing from the spirit of the invention as expressed by the appended claims.

I claim:

1. In a rotary work table device having a rotatably mounted plate, means for rotating said plate to a plurality of work stations and for locking said plate at each of said work stations, said means comprising
   (a) said plate being provided with a plurality of peripheral notches,
   (b) means engaging in at least one of said notches at a time for imparting driving rotation to said plate, and
   (c) means comprising a single operative element entering said notch and dislodging said driving means upon rotation of said plate to the desired work station whereby said work plate is locked at said work station.

2. The device as defined in claim 1 and in which said driving means comprises,
   (a) a rotatably mounted hub member,
   (b) means reciprocably rotating said hub member, and
   (c) a driving dog carried by said hub member and means resiliently urging said dog into said notch when said hub member is rotated to a position bringing said driving dog into registry with one of said notches.

3. The device as defined in claim 2 and in which the operative element of said dislodging means comprises a cylindrical member and means resiliently urging the end portion of said cylindrical member into said notch when said plate is rotated to a position in which one of said notches is brought into a position in registry with said cylindrical member.

4. The device as defined in claim 3 and in which said second mentioned resilient means is stronger than said first mentioned resilient means.

5. The device as defined in claim 3 and including cam means carried by said hub member for dislodging said cylindrical member from said notch upon return of said hub member to a starting position whereby said driving dog can enter the next notch to move said plate to the next work station.

6. The device as defined in claim 3 and including a pawl member disposed to register with another of said notches upon entry of said cylindrical member in one of said notches.

7. In a rotary work table device having a rotatably mounted plate, means for rotating said plate to a plurality of work stations and for locking said plate at each of said work stations, said means comprising,
   (a) said plate being provided with a plurality of equally spaced peripheral notches,
   (b) a hub member rotatably supported on an axis aligned with the axis of said plate,
   (c) said hub member carrying a driving dog and means urging said driving dog into one of said notches at a starting position of said hub member,
   (d) means reciprocably rotating said hub member between said starting position and an index position,
   (e) means disengaging said driving dog from said notch at said index position,
   (f) said disengaging means including a cylindrical member and means urging said cylindrical member into said notch to lock said plate at said index position.

8. The device as defined in claim 7 and in which
   (a) said first mentioned urging means comprises a first spring member, and
   (b) said second mentioned urging means comprises a second spring member, and
   (c) said second spring member exerting a stronger force than said first spring member.

9. The device as defined in claim 7 and including means dislodging said cylindrical member from said notch upon return of said hub member to said starting position.

10. The device as defined in claim 9 and in which said last mentioned dislodging means comprises a cam member carried by said hub member and engaging said cylindrical member in an area of movement adjacent said starting position.

11. The device as defined in claim 7 and in which said rotating means comprises
    (a) a cylinder operable to reciprocably move a rod,
    (b) linkage means connecting said rod to said hub member to impart reciprocating rotational movement to said hub member upon reciprocating movement of said rod.

References Cited

UNITED STATES PATENTS 3,166,955   1/1965   Hediger _____ 74—822

FRED C. MATTERN, Jr., *Primary Examiner.*